United States Patent [19]
Ejiri et al.

[11] Patent Number: 5,175,566
[45] Date of Patent: Dec. 29, 1992

[54] IMAGE COMMUNICATING APPARATUS WITH INK JET PRINTER HAVING CONTROLLED CAPPING OPERATION

[75] Inventors: Seishi Ejiri, Kawasaki; Yasuyuki Shinada, Yokohama, both of Japan

[73] Assignee: Canon Kabushiki Kaisha, Tokyo, Japan

[21] Appl. No.: 846,739

[22] Filed: Mar. 5, 1992

Related U.S. Application Data

[63] Continuation of Ser. No. 619,515, Nov. 29, 1990, abandoned.

[30] Foreign Application Priority Data

Feb. 23, 1990 [JP] Japan .................. 2-041058

[51] Int. Cl.⁵ .......................... B41J 2/05
[52] U.S. Cl. .................. 346/140 R; 358/296; 358/404
[58] Field of Search ........... 346/140 R, 75; 358/404, 358/405, 444

[56] References Cited

U.S. PATENT DOCUMENTS

| | | | |
|---|---|---|---|
| 4,123,671 | 10/1978 | Kimura et al. | 346/140 R |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,745,414 | 5/1988 | Okamura et al. | 346/140 R |
| 4,970,599 | 11/1990 | Nobuta | 358/296 |
| 4,972,270 | 11/1990 | Kurtin et al. | 358/296 |
| 4,999,643 | 3/1991 | Terasawa | 346/1.1 |

FOREIGN PATENT DOCUMENTS

| | | |
|---|---|---|
| 201772 | 11/1986 | European Pat. Off. |
| 55-026702 | 2/1980 | Japan |
| 56-064557 | 6/1981 | Japan |
| 59-123670 | 7/1984 | Japan |
| 59-138461 | 8/1984 | Japan |
| 60-002368 | 1/1985 | Japan |
| 60-051364 | 3/1985 | Japan |

*Primary Examiner*—Benjamin R. Fuller
*Assistant Examiner*—David Yockey
*Attorney, Agent, or Firm*—Fitzpatrick, Cella, Harper & Scinto

[57] ABSTRACT

A facsimile apparatus is equipped with an ink jet printing unit, capable of reducing the number of ink discharge recovery operations of the ink jet recording head, thereby reducing the ink consumption. The received image data are stored in an image memory, with inspection for errors in transmission in an error correction mode, and are collectively printed after a predetermined amount of image data are stored. The recording head is uncapped by a protocol signal transmitted after the image data.

16 Claims, 10 Drawing Sheets

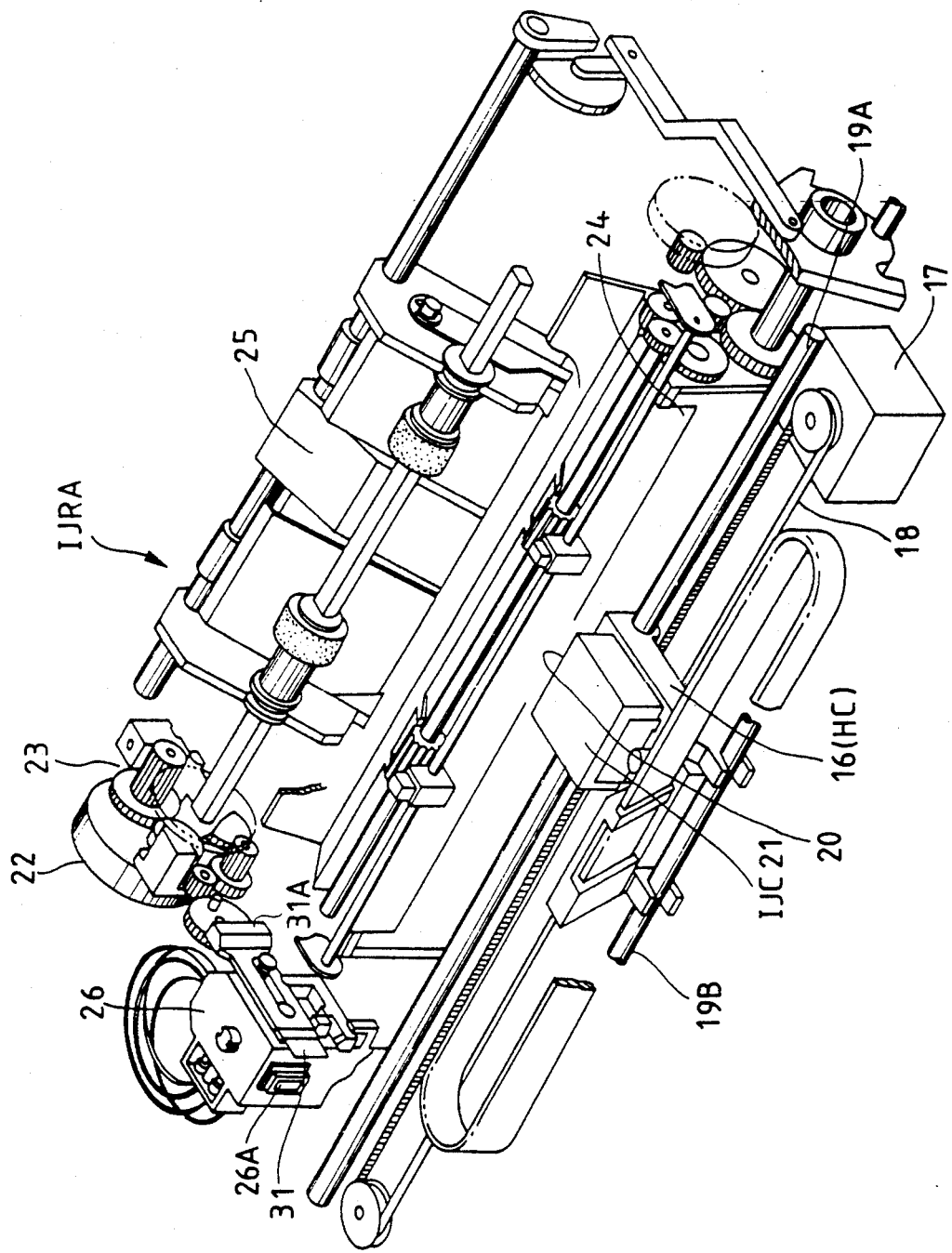

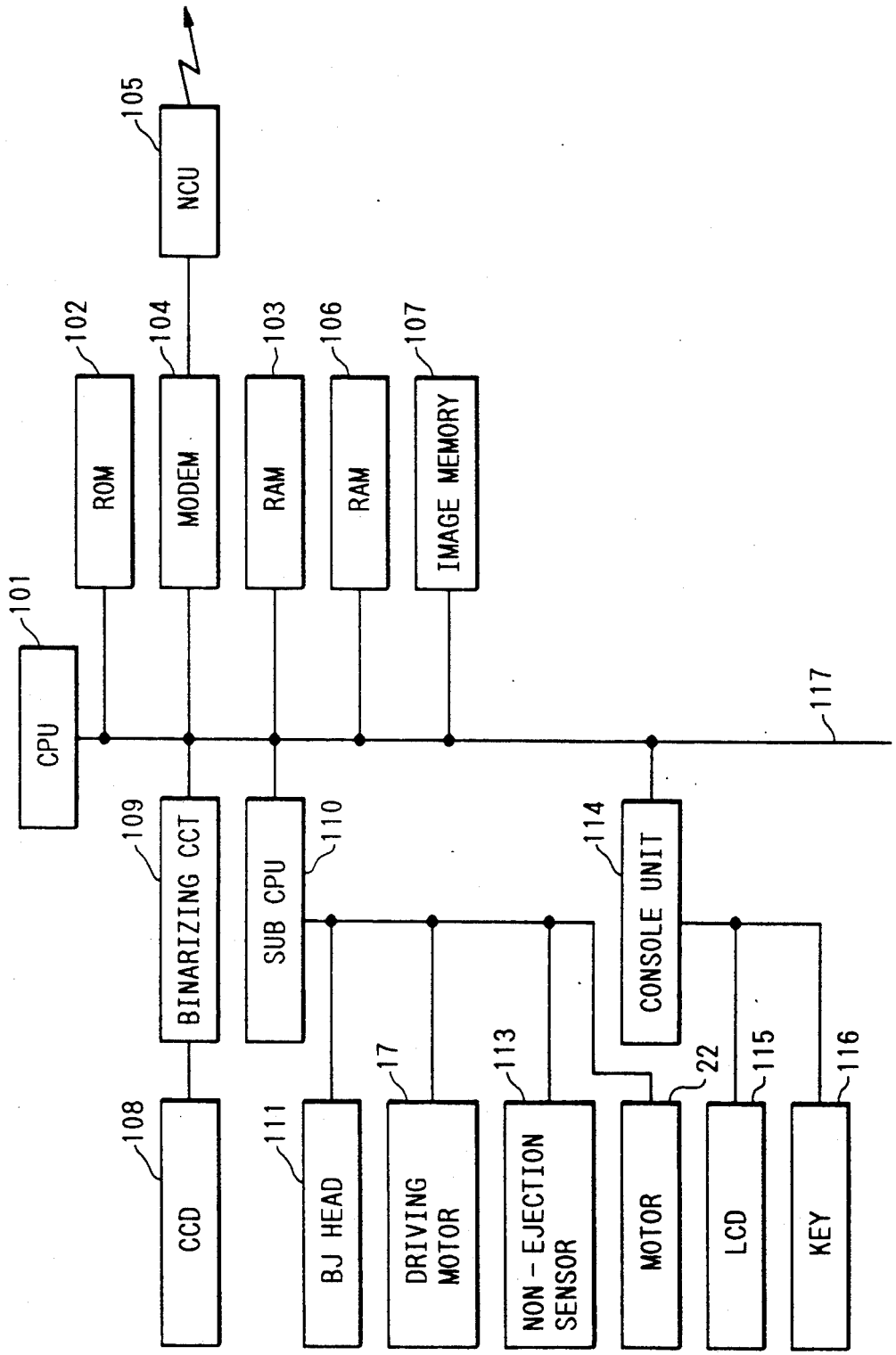

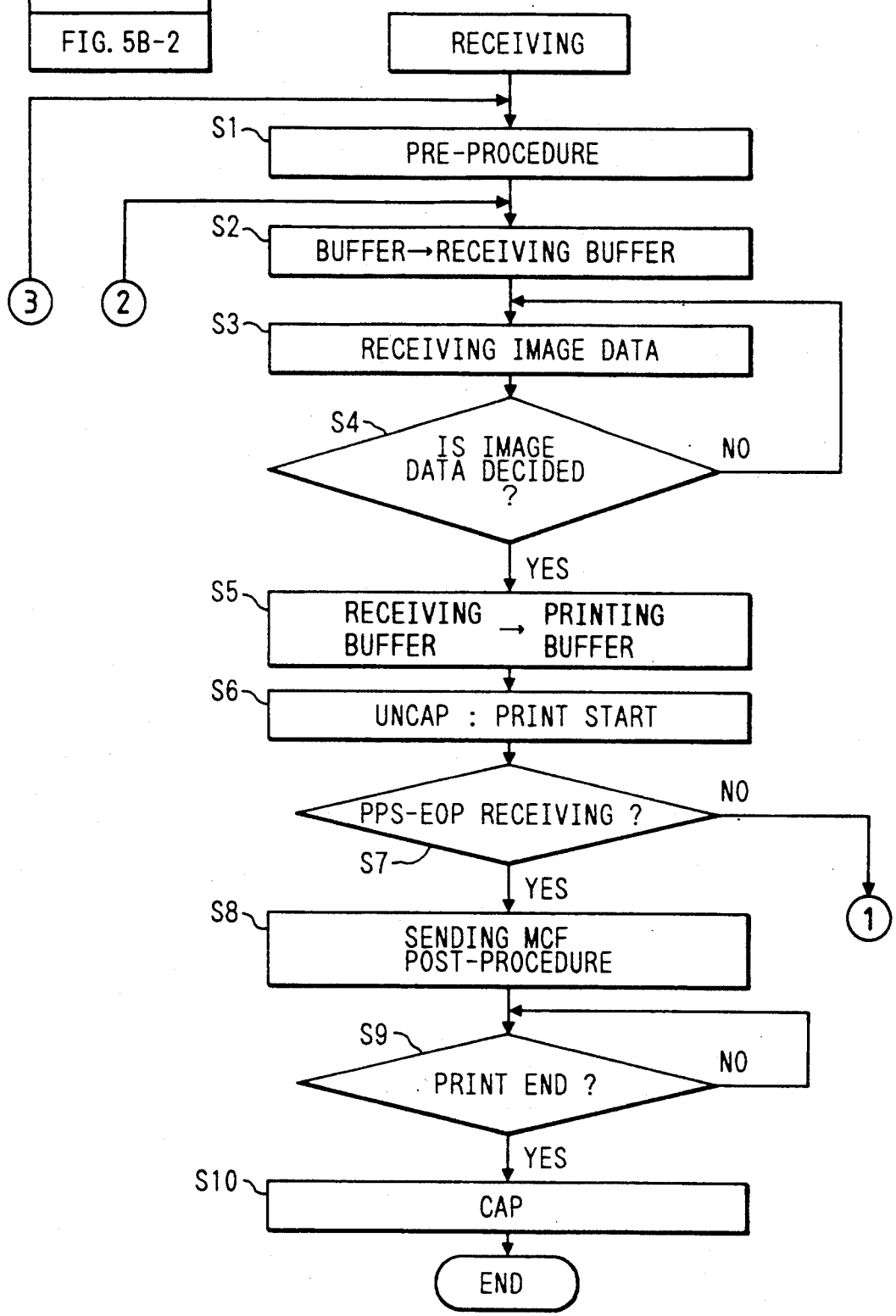

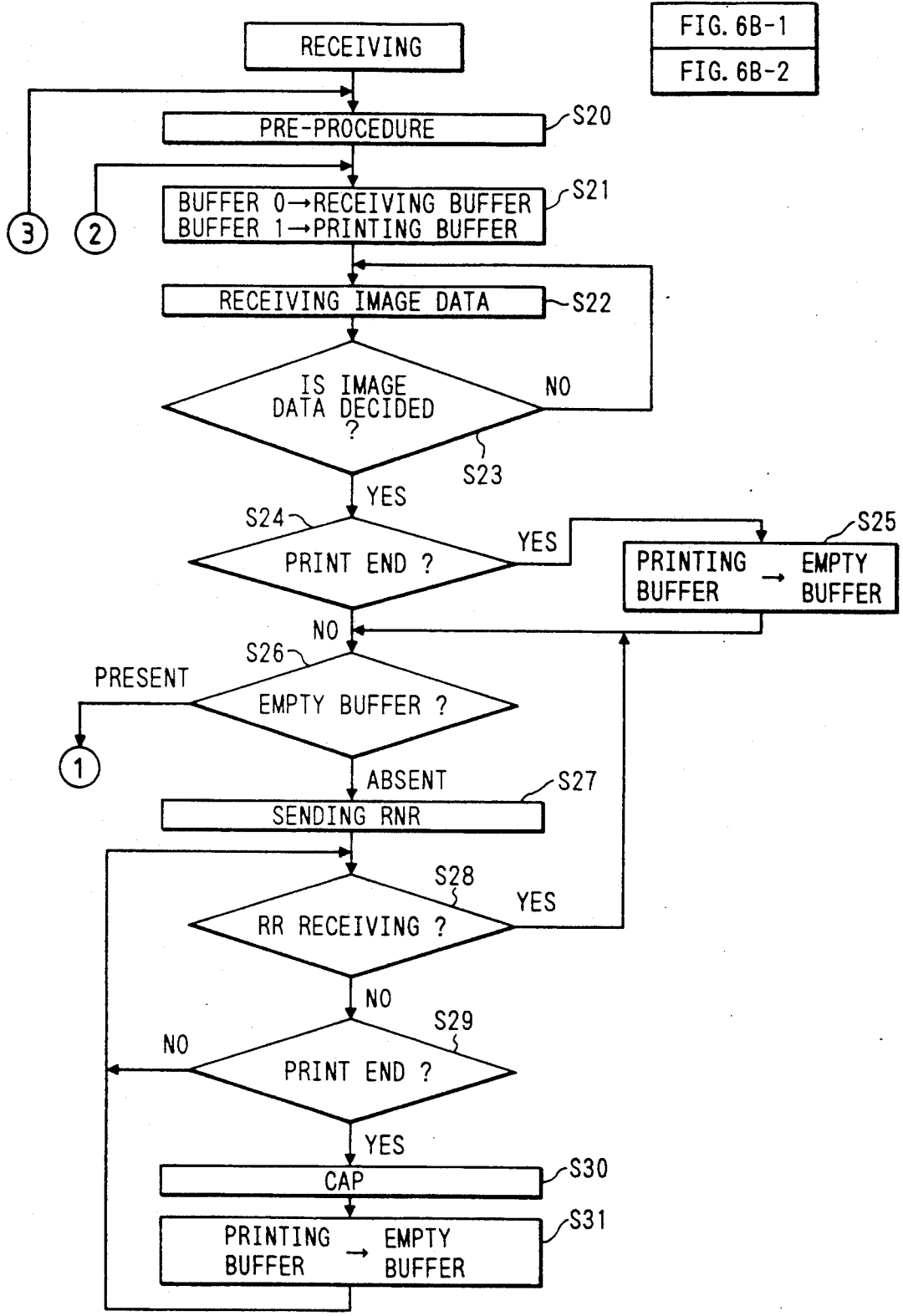

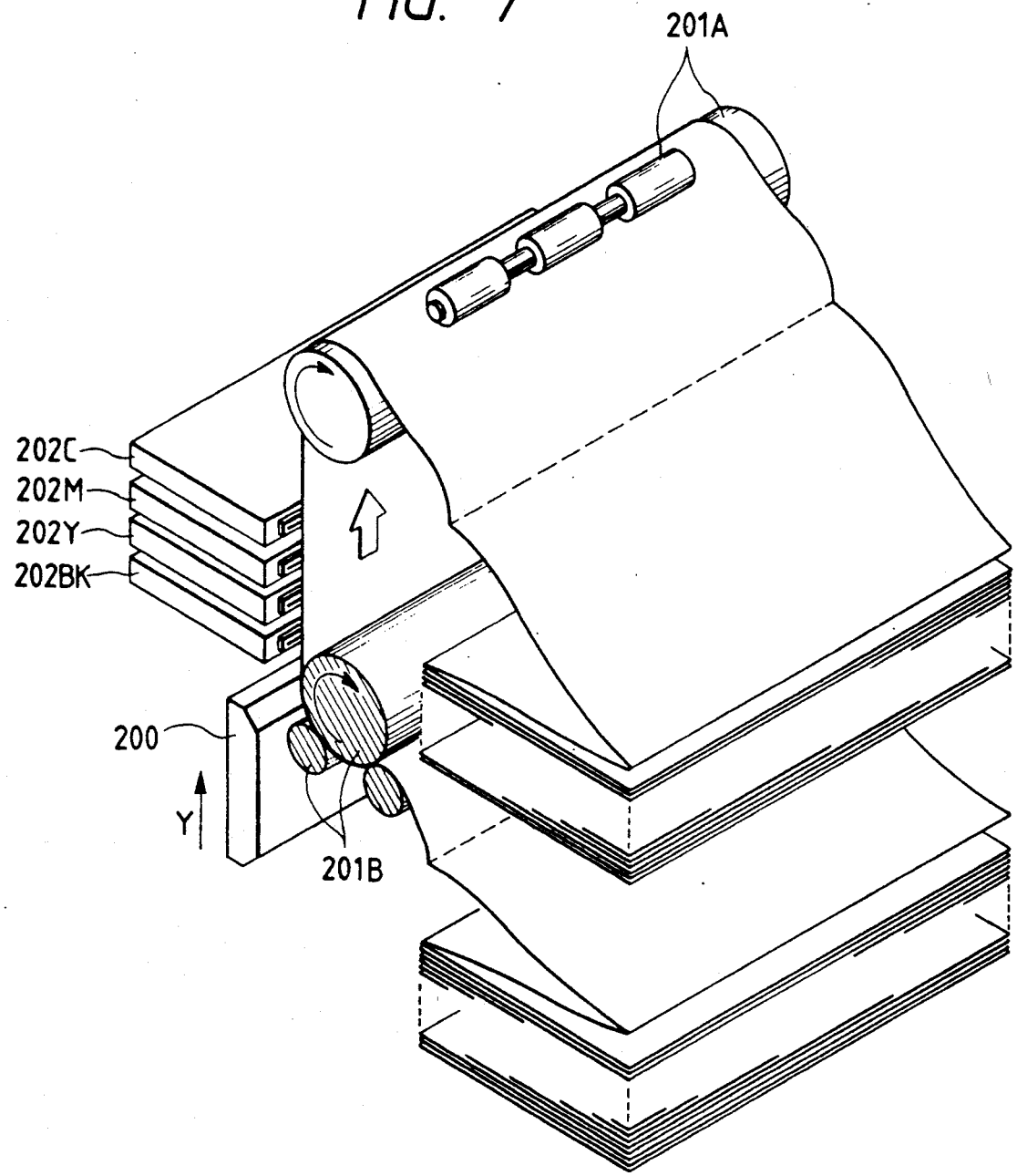

IMAGE COMMUNICATING APPARATUS WITH INK JET PRINTER HAVING CONTROLLED CAPPING OPERATION

This application is a continuation of application Ser. No. 07/619,515 filed Nov. 29, 1990 now abandoned.

BACKGROUND OF THE INVENTION

1. Field of the Invention

The present invention relates to an image communicating apparatus such as a facsimile apparatus, and more particularly to an image communicating apparatus equipped with an ink jet recording head and adapted to effect image reception according to an error correction mode.

2. Related Background Art

There have recently been developed ink jet printers that use a so-called bubble jet process, in which liquid ink is discharged from discharge openings, by means of bubbles generated by thermal energy, toward a recording material thereby recording characters or other patterns. Such printers can achieve a high-density arrangement of multiple discharge openings, because the heat-generating resistor (heater) provided in each discharge opening is significantly smaller than the piezoelectric element employed in the conventional ink jet printers, and has the advantages of providing a recorded image of high quality and achieving high-speed recording with low noise.

On a other hand the facsimile apparatus is requested not only to transmit an image at a high speed but also to receive an image of higher quality at a high speed. The bubble ink jet printer, with the above-explained features, is considered to respond to such requirements, but the facsimile apparatus equipped with such bubble ink jet printer has not been commercialized.

In ink jet printers, the ink discharge openings of the recording head may become blocked by the ink the viscosity of which is increased by a pause in the use of the recording head, by a low humidity atmosphere or by a difference in the frequency of use of the discharge openings, or by the deposited dusts. For this reason there has been employed a discharge recovery mechanism for expelling the viscosified ink by pressurizing the interior of the recording head or sucking such viscosified ink through a cap member covering and protecting the discharge openings of the recording head. Even in the course of recording operation, such blocking may occur in the discharge openings of lower frequency of use, as the frequency of ink discharge is not uniform and some discharge openings may not be used at all. Since such blocking deteriorates the image quality, recovery operations for ink discharge are generally considered necessary at regular intervals.

Therefore, in case of incorporating an ink jet printer in a facsimile apparatus, it becomes necessary to protect the discharge openings of the recording head from drying or blocking, since the printing operation is not possible between pages in the reception of plural pages.

For this purpose the above-explained recovery operation has to be conducted frequently, leading to a wasted consumption of the recording ink.

SUMMARY OF THE INVENTION

In consideration of the foregoing, an object of the present invention is to provide an improved image communicating apparatus.

Another object of the present invention is to provide an image communicating apparatus capable of reducing the number of recovery operations for the recording head.

Still another object of the present invention is to provide an image communicating apparatus capable of a recovery operation for the recording head, suitable for a case of storing the received data in memory means and subsequently recording said data in collective manner.

Still another object of the present invention is to provide an image communicating apparatus capable of reducing the number of recovery operations for the recording head in case of image reception in the error correction mode.

Still another object of the present invention is to provide an image communicating apparatus capable, in the image reception in the half-doubled or full-doubled error correction mode, of uncapping the recording head and effecting the collective recording when the amount of received image data reaches a certain capacity (for example 64 Kbytes) of the memory (for example at the reception of a PPS-NULL signal) or when a page of the original is fixed (for example by the reception of a PPS-MPS, PPS-EOM or PPS-EOP signal), thereby reducing the entire time required for recording (namely the uncapped time), thus reducing the number of idle ink discharges and minimizing the wasted ink consumption.

The foregoing and still other objects of the present invention will become fully apparent from the following description, to be taken in conjunction with the attached drawings.

BRIEF DESCRIPTION OF THE DRAWINGS

FIG. 3 is a perspective view of a recording system of a facsimile apparatus which utilizes the ink jet cartridge shown in FIG. 2 and in which the present invention is applicable;

FIG. 4 is a block diagram of the circuit structure of the facsimile apparatus embodying the present invention;

FIGS. 5A, 5B, 5B-1, and 5B-2 are respectively a chart and a flow chart showing the printing sequence in an embodiment of the present invention;

FIGS. 6A, 6B, 6B-1, and 6B-2 are similar charts showing another printing sequence;

FIG. 7 is a schematic perspective view of a full-line ink jet recording apparatus constituting another embodiment.

DETAILED DESCRIPTION OF THE PREFERRED EMBODIMENTS

Now the present invention will be clarified in detail by embodiments thereof shown in the attached drawings.

Basic structure

Figure 1:
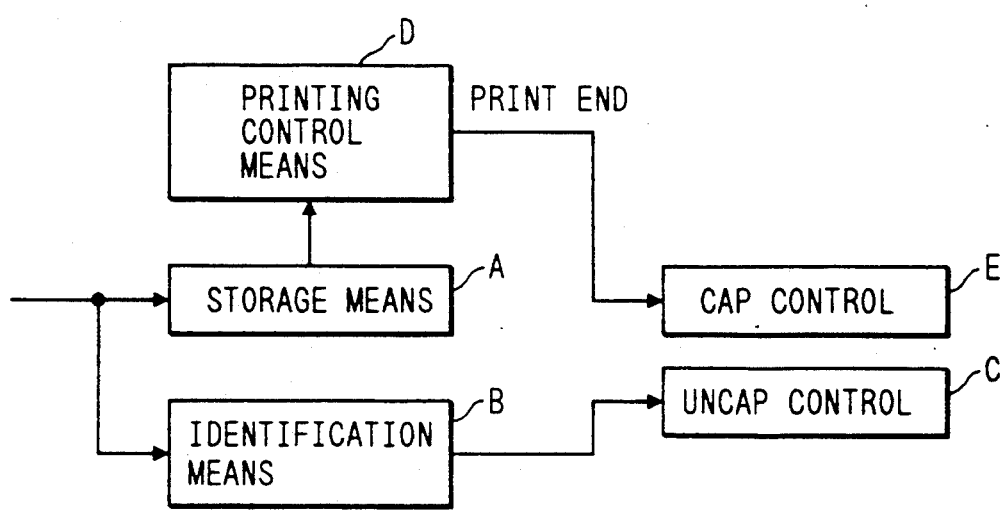
FIG. 1 is a schematic view showing the basic structure of an embodiment of the present invention.

FIG. 1 shows the basic structure of a embodiment of the image communicating apparatus of the present invention. The present embodiment is a facsimile apparatus having an ink jet recording head and adapted to effect image reception according to the error correction mode, provided with memory means A for storing a group of image signals transmitted from a transmitting unit; identification means B for identifying a protocol signal transmitted in succession to said image signal; uncapping control means C for detaching a cap from said ink jet recording head in response to the output of said identifying means; printing control means E for collectively printing the image data stored in said memory means after said cap is detached; and capping control means E for capping said recording head after said collective printing.

Structure of recording system (printer)

Figure 2:
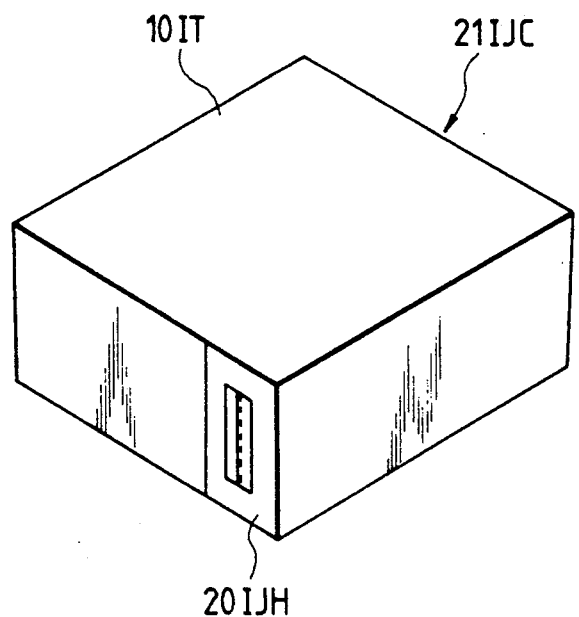
FIG. 2 is a perspective view of an ink jet cartridge for bubble jet recording, in which the present invention is applicable.

FIGS. 2 and 3 illustrate an example of the ink jet printer adapted for use as the recording system for the facsimile apparatus embodying the present invention, wherein IJH indicates an ink jet recording head using the bubble jet process; IJC indicates a detachable ink jet cartridge integral with the ink jet head IJH and provided with a tank IT for supplying ink thereto; and IJRA is the main body of the ink jet recording apparatus.

In the ink jet cartridge IJC of the present embodiment, as shown in FIG. 2, the front end of the ink jet recording head IJH protrudes slightly from the front face of the ink tank IT. Said ink jet head cartridge IJC is of disposable type and is detachably mounted on a carriage provided in the ink jet recording apparatus IJRA to be explained later.

A first ink tank IT (10) containing the ink to be supplied to the ink jet head (IJH) is composed of an ink absorbent member, a container housing said ink absorbent member, and a cover member sealing said container (these members not being shown). Said ink tank IT (10) is filled with ink which is supplied to the ink jet head responding to the ink discharge therefrom.

In the present embodiment, a front plate is composed of a resinous material of excellent ink resistance such as polysylfone, polyethersulfone, polyphenyleneoxide or polypropylene.

The ink jet cartridge IJC explained above is detachably mounted, in a predetermined method, on the carriage HC of the ink jet recording apparatus IJRA as will be explained later, and desired image recording is achieved by the control of relative movement between the carriage HC and the recording material in response to recording signals.

FIG. 3 is an external perspective view of an example of the ink jet recording apparatus IJRA equipped with the mechanisms for the above-explained process.

In FIG. 3, an ink jet recording head 20 of the ink jet cartridge IJC is provided with a group of nozzles for ink discharge toward a recording face of a recording sheet, which is supplied from a sheet feeding unit 25 onto a platen 24. A carriage 16 (HC) supporting the recording head 20 is linked with a part of a driving belt 18 transmitting the driving force of a driving motor 17 and is rendered slidable along two parallel guide shafts 19A, 19B, whereby the recording head 20 can reciprocate over the entire width of the recording sheet.

A heat recovery unit 26 is provided at an end of the moving path of the recording head 20, for example at a position opposed to the home position of the recording head. Said head recovery unit 26 is activated to cap the recording head 20, by a motor 22 through a transmission mechanism 23. In cooperation with the capping operation of the recording head 20 by a cap member 26A of said unit 26, ink is forcedly discharged from the discharge openings either by ink suction with suitable suction means (such as a suction pump) provided in the head recovery unit 26 or by ink pressurizing by suitable pressurizing means provided in the ink supply path to the recording head 20. Thus the viscous ink can be removed from the discharge openings. Also said capping protects the recording head after the end of recording operation.

A wiping blade 31 of silicone rubber, provided at a side of the head recovery unit 26, is supported by a cantilever mechanism on a blade support member 31A and is rendered engageable with the ink discharge face of the recording head 20 by means of the motor 22 and the transmission mechanism 23 in the same manner as the head recovery unit 26. Thus the blade 31 is made to protrude into the moving path of the recording head 20 at a suitable timing in the course of recording operation of said head 20 or after the discharge recovery operation by the recovery unit 26, thereby wiping off the liquid or dust deposited on the ink discharge face of the head 20 as the result of movement thereof.

Structure of control system

FIG. 4 shows an example of the circuit structure of the facsimile apparatus of the present embodiment. There are provided a CPU (central processing unit) 101 such as a microcomputer for controlling the data transmission and reception of the entire apparatus through a bus 117; a read-only memory (ROM) 102 storing programs corresponding to control sequences as shown in FIGS. 5B, 5B-1, 5B-2 and 6B, 6B-1, 6B-2; a random access memory (RAM) 103 used as a work memory for the CPU 101; a modulator-demodulator (MODEM) 104 for data transmission; a network control unit (NCU) 105 connected with the MODEM 104 and used for connection with public telephone lines; a registration RAM 106 for registering data such as telephone numbers and abbreviations; and an image RAM (DRAM) 107 for temporarily storing image data. Said memory 107 is used as an ECM buffer as will be explained later.

A CCD (charge coupled device) 108 serving image pickup means of the original image reading system, converts the original image focused through an imaging lens such as a rod lens array into electrical signals. A binary digitizing circuit 109 converts the output signals of the CCD 108 into binary signals.

A recording head 111 is provided in the recording system, which is composed, in the present embodiment, of a bubble jet recording apparatus as shown in FIGS. 2 and 3. A sub CPU 110 is provided for controlling the bubble jet head 111, carriage driving motor 17, recovery unit 26, driving motor 22 therefor, a non-discharge sensor 113 etc., and is provided therein with a ROM storing a control program for image recording.

An operation unit 114 is provided with a liquid display device (LCD) 115 and various keys 116.

The facsimile apparatus of the present embodiment is capable of communication in the ECM (error correction mode), which enables data transmission and reception without line omission, according to CCITT recommendation.

The error correction in said mode can be realized either by image error resending by half-doubled communication or by image error resending by full-doubled communication.

In the error correction mode with the half-doubled communication, the image data are divided into blocks, and each block is transmitted in a certain number of frames. The receiving unit effects error recognition upon reception of each frame, and this operation is repeated until the reception of image data of a block or a page. After the reception of data of a block, if there are frames including errors, a request for resending such error frames is sent to the transmitting unit. In response, the transmitting unit only resends the frames in which the error occurred, and the transmission of a next data block is started after the reception of correct image data is confirmed.

In the error correction mode with the full-doubled communication, the image data are transmitted in the unit of a frame. The receiving unit effects the error detection for each received frame, and, upon detection of an error frame, causes the transmitting unit to immediately terminate the transmission of image data and requests the resending of said error frame. The transmitting unit restarts the image data transmission from said frame in which the error occurred.

Data of a frame consists of a field containing a frame number, a field containing image data and a field containing error check data, and the error detection is achieved by the correct reception of said error check data (CRC) and by the continuity of the received frame numbers. In the present embodiment, a frame is composed of 256 bytes, and a block is composed of 0–255 frames.

Example of control sequence

Figure 5A:
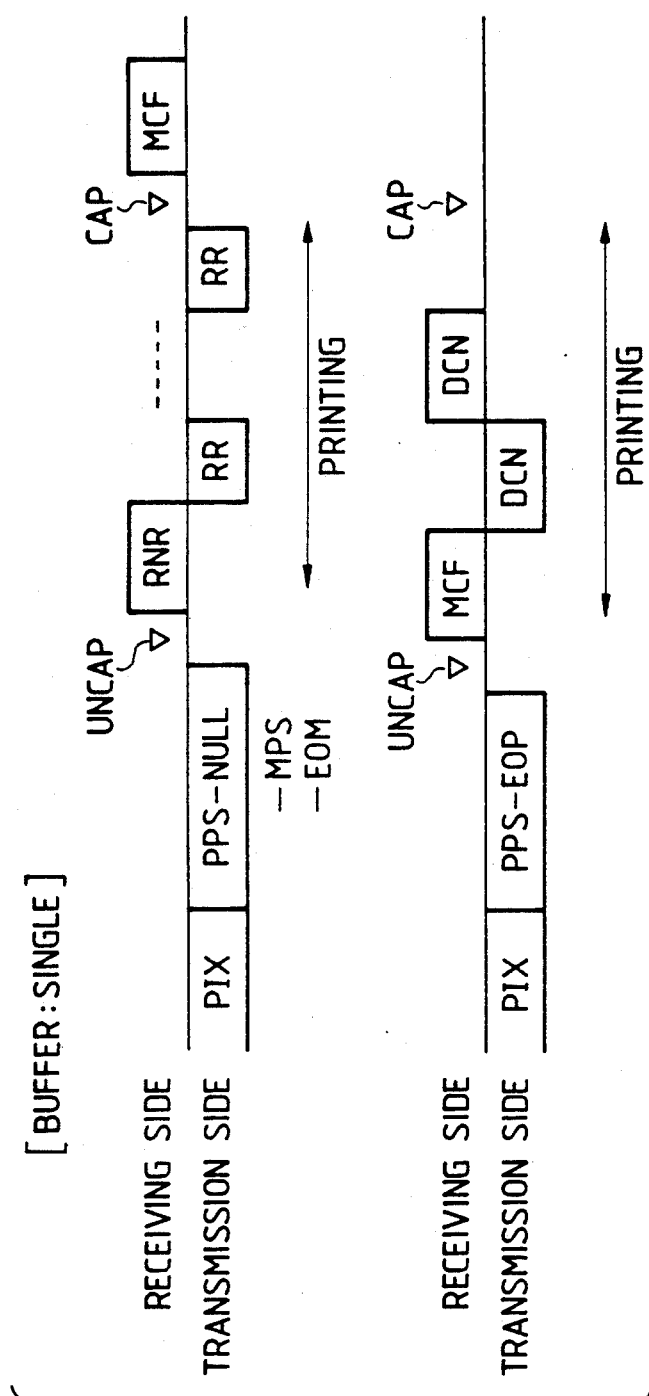

FIG. 5A shows the printing sequence in case an ECM buffer of 64 Kbytes is employed as the image memory 107 shown in FIG. 4.

In this embodiment, the main CPU 101 receives data in the error correction mode with the half-doubled communication.

More specifically, the main CPU 101 inspects the error check code CRC and the continuity of the frame number upon reception of each frame, and, in the absence of error, stores the received data in a predetermined area of the ECM buffer. It also memorizes the presence or absence of error for each frame. Upon reception of data of a block, it transmits the data indicating the presence or absence of errors in the 0-th to 255th frames to the transmitting unit, which, in response, resends only the frames in which errors occurred.

Then, when the data of a block are stored in the image memory 107, the data reception is once disabled and the recording 20 is uncapped to initiate the recording of the data stored in the image memory 107. More specifically, as shown in the upper half of FIG. 5A, when the transmitting unit sends the image signal PIX followed by a PPS (partial page signal)-NULL, PPS-MPS (multi page signal) or PPS-EOM (end of message), the present facsimile apparatus at the receiving side uncaps the recording head for effecting the recording operation, and sends a signal RNR (reception not realizable), indicating that the reception of image data is disabled. In response the transmitting unit sends a signal RR (reception realizable) asking whether the reception of image data is realizable, and the exchange of the signals RNR and RR is thereafter repeated. In the course of repeated exchanges of said signals RNR and RR, the received image data are collectively printed, and the recording head is capped upon completion of the printing operation. Then a signal MCF (message confirmation) is sent to the transmitting unit, which, in response, effects again the transmission of the image signal.

The lower half in FIG. 5A shows the printing sequence in case the image signal PIX is followed by a signal PPS-EOP (end of protocol). Also in this case, the facsimile apparatus uncaps the recording head to initiate the collective printing of the received data. In this case the facsimile apparatus sends a signal MCF (message confirmation) to the transmitting unit, then receives a signal DCN (disconnect command) therefrom, and sends the signal DCN (disconnect command). The recording head is capped at the end of the printing operation.

Figures 2, 5B:
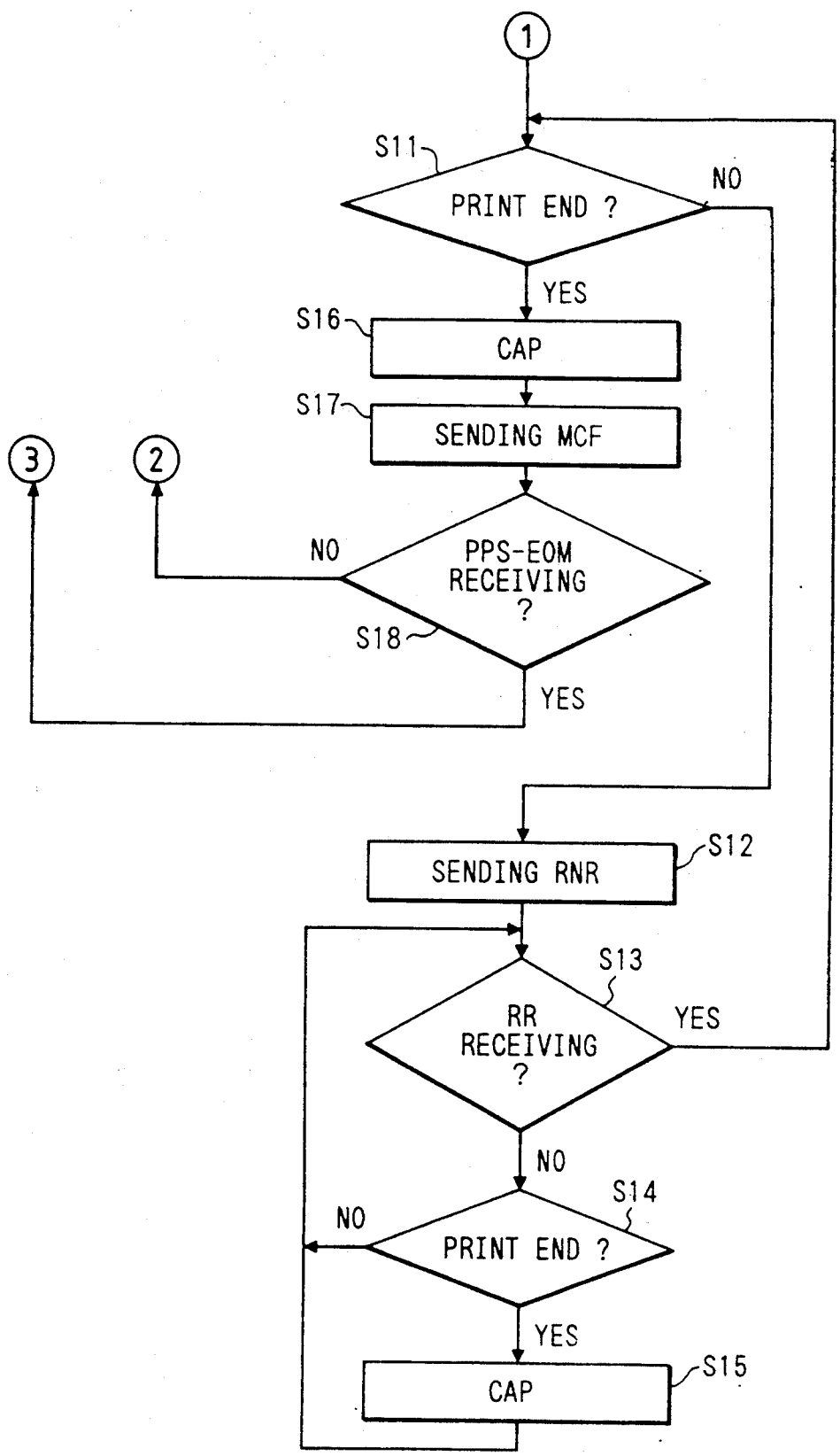

FIG. 5B, 5B-1, and 5B-2 are is a flow chart for executing the printing sequence shown in FIG. 5A. The contents of the steps in this flow chart are as follows:

S1: confirms the mode of received page (width of original/density of sub scanning lines) by a pre-procedure;

S2: selects the ECM buffer (64 Kbytes) (memory 107) as the reception buffer for the compression encoded image data;

S3: reads compression encoded image data of a byte from the modem and stores said data in the reception buffer;

S4: Steps S3 and S4 are repeated until the reception buffer (64 Kbytes) becomes full (indicated by the reception of PPS-NULL) or until the reception of image data of a page (indicated by the reception of PPS-MPS, PPS-EOM or PPS-EOP);

S5: selects the reception buffer as the printing buffer when the image data are fixed;

S6: instructs the sub CPU 110 to drive the motor 22 for uncapping the recording head and to initiate the printing operation; then reads the compression encoded image data from the printing buffer and decodes said data, thereby effecting conversion into original data. The sub CPU 110 receives said original data, and effects printing by controlling the bubble jet head 111 and the driving motor 112;

S7: transfers the sequence to a step S8 if PPS-EOP is received in the step S4, or to a step S11 otherwise;

S8 sends the signal MCF, effects a post-procedure (reception/transmission of DCN) and terminates the communication;

S9: awaits the completion of printing;

S10: activates the motor 22 after the end of printing, thereby capping the recording head;

S11: in case of reception other than PPS-EOP, discriminates whether the printing is terminated, and the sequence proceeds to a step S12 if not terminated, or to a step S16 for capping if terminated;

S12: sends a signal RNR;

S13: discriminates whether a signal RR has been received, and the sequence proceeds to the step S11 or to a step S14 respectively if said signal has been received or not;

S14: discriminates whether the printing operation has been completed, and, if completed, the sequence proceeds to a step S15 for capping the recording head, or, if not completed, the sequence returns to the step S13;

S17: sends a signal MCF;

S18: If PPS-EOM is received in the step S4, the sequence returns to the step S1 to repeat the procedure from the pre-procedure. If other signal PPS-NULL or PPS-MPS is received, the sequence returns to the step S2 for receiving next image data.

Figure 6A:
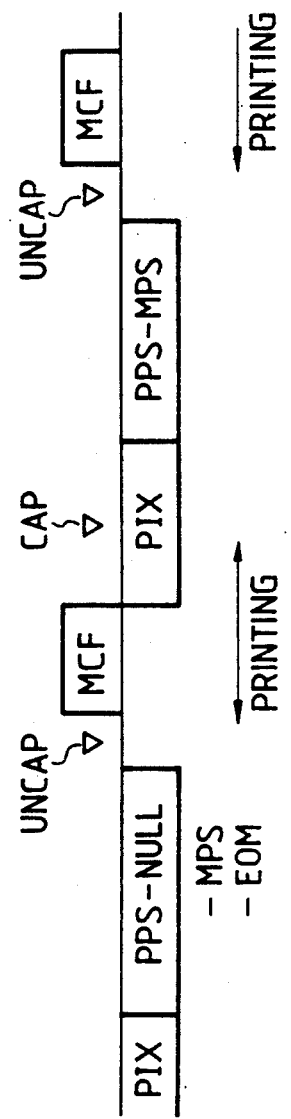

FIG. 6A shows the sequence of collective printing employing two ECM buffers of 64 Kbytes (ECM buffer 0 and ECM buffer 1) as the image memory 107 shown in FIG. 4. The illustrated printing sequence is rendered possible by utilizing one of said buffers as the reception buffer and the other as the printing buffer.

Also in this case, the data reception is conducted in the error correction mode with half-doubled or full-doubled communication. Then, upon storage of data of 64 Kbytes in the buffer 0 or 1 or upon reception of image data of a page, the recording head 20 is uncapped, and the printing operation is initiated by reading the data from said buffer. Also a signal MCF (message confirmation) is sent to the transmitting unit, which, in response, sends next image data. Simultaneous with said printing operation, the receiving unit stores the received data in the other buffer. If data of 64 Kbytes are not stored in the other buffer nor the reception of image data of a page has been completed at the end of the printing operation, the recording head 20 is capped and the apparatus enters a standby state. Subsequently, when the data of 64 Kbytes are received or when the reception of image data of a page is completed, the recording head 20 is again uncapped to start the printing operation.

On the other hand, if data of 64 Kbytes are received in the other buffer or if the reception of image data of a page is completed at the end of the printing operation, the next printing operation is immediately started without capping the recording head.

Figures 2, 6B:
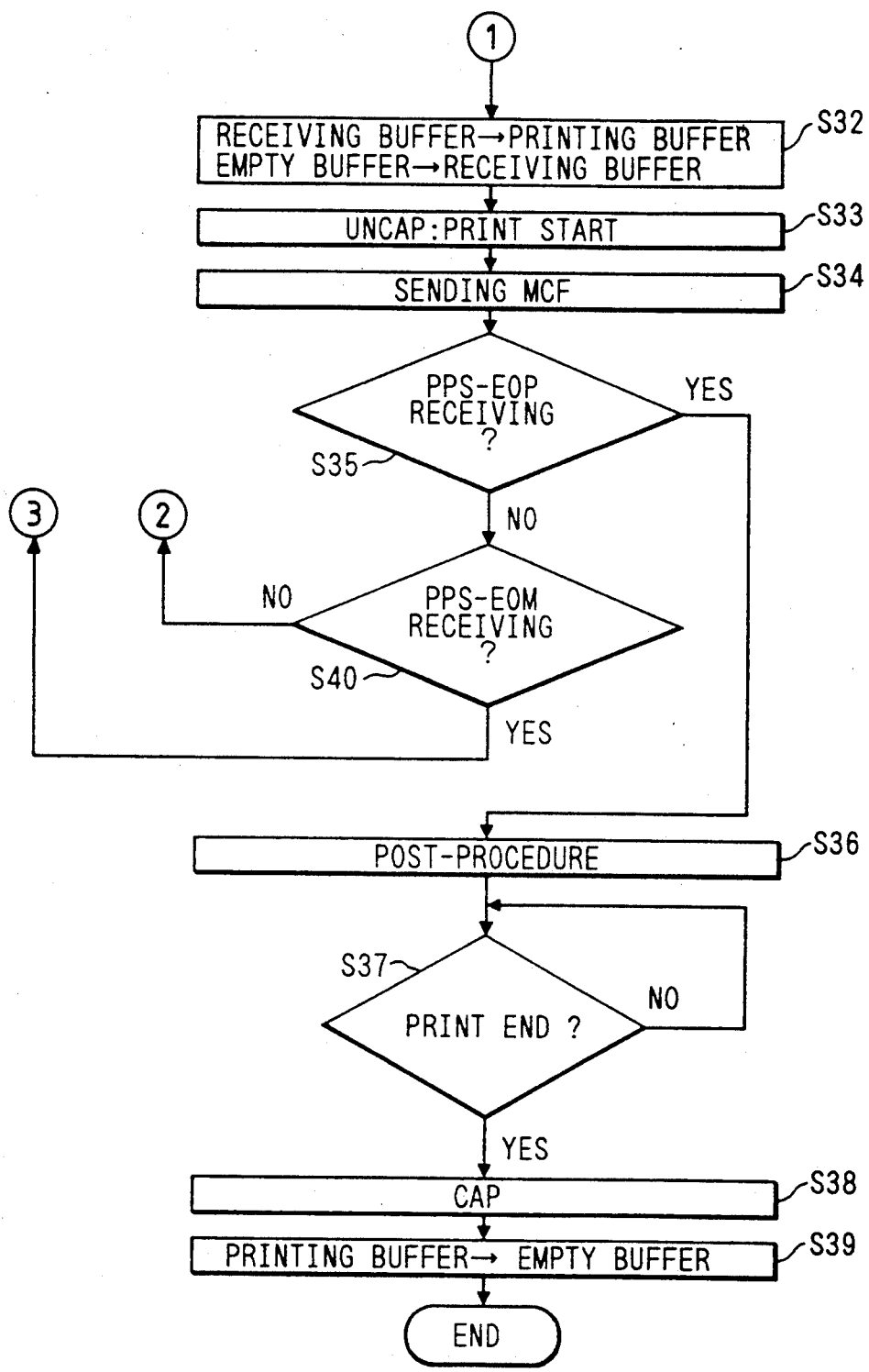

FIG. 6B, 6B-1, and 6B-2 are a flow chart for executing the printing sequence shown in FIG. 6A. The contents of the steps in said flow chart are as follows:

S20: fixes the mode of the received page (width of the original/density of sub scanning lines) by a pre-procedure:
S21: selects the ECM buffer (64 Kbytes) 0 as the reception buffer for receiving the compression encoded image data, and the other ECM buffer (64 Kbytes) 1 as the printing buffer;
S22: reads the compression encoded image data of a byte from the modem and stores said data in the reception buffer;
S23: Steps S22 and S23 are repeated until the reception buffer (64 Kbytes) becomes full (indicated by the reception of PPS-NULL), or image data of a page is completed (indicated by the reception of PPS-MPS, PPS-EOM or PPS-EOP);
S24: discriminates whether the printing operation has been completed, when the image data are fixed;
S25: if completed, renders the printing buffer as an empty buffer;
S26: discriminates whether there is an empty buffer;
S27: sends a signal RNR;
S28: discriminates whether a signal RR has been received, and the sequence proceeds to a step S26 or S29 respective if received or not;
S29: discriminates whether the printing operation has been completed, and, if completed, a step S30 activates the motor 22 to cap the recording head. If not completed, the sequence returns to the step S28;
S31: renders the printing buffer as an empty buffer;
S32: selects the reception buffer as the printing buffer and the empty buffer as the reception buffer;
S33: instructs the sub CPU 110 to activate the motor 22 for uncapping the recording head 20 and to start the printing operation; reads the compression encoded image data from the printing buffer and converts said data into original image data. In response the sub CPU 110 receives said original data and effects the printing operation;
S34: sends a signal MCF;
S35: transfers the sequence to a step S36 if PPS-EOP is received in the step S23, or to S40 otherwise;
S36: effects a post-procedure (reception/transmission of DCN) and terminates the communication;
S37: awaits the completion of the printing operation;
S38: after the completion of the printing operation, activates the motor 22 to cap the recording head 20;
S39: renders the printing buffer as an empty buffer;
S40: The sequence returns to the step S20 to repeat the sequence from the pre-procedure in case the PPS-EOM is received in the step S23, or to the step S21 for receiving next image data if another signal (PPS-NULL or PPS-MPS) is received.

Though the foregoing embodiments have been explained in the error correction mode with half-doubled communication, the control may naturally be based on the full-doubled error correction mode.

Figure 8:
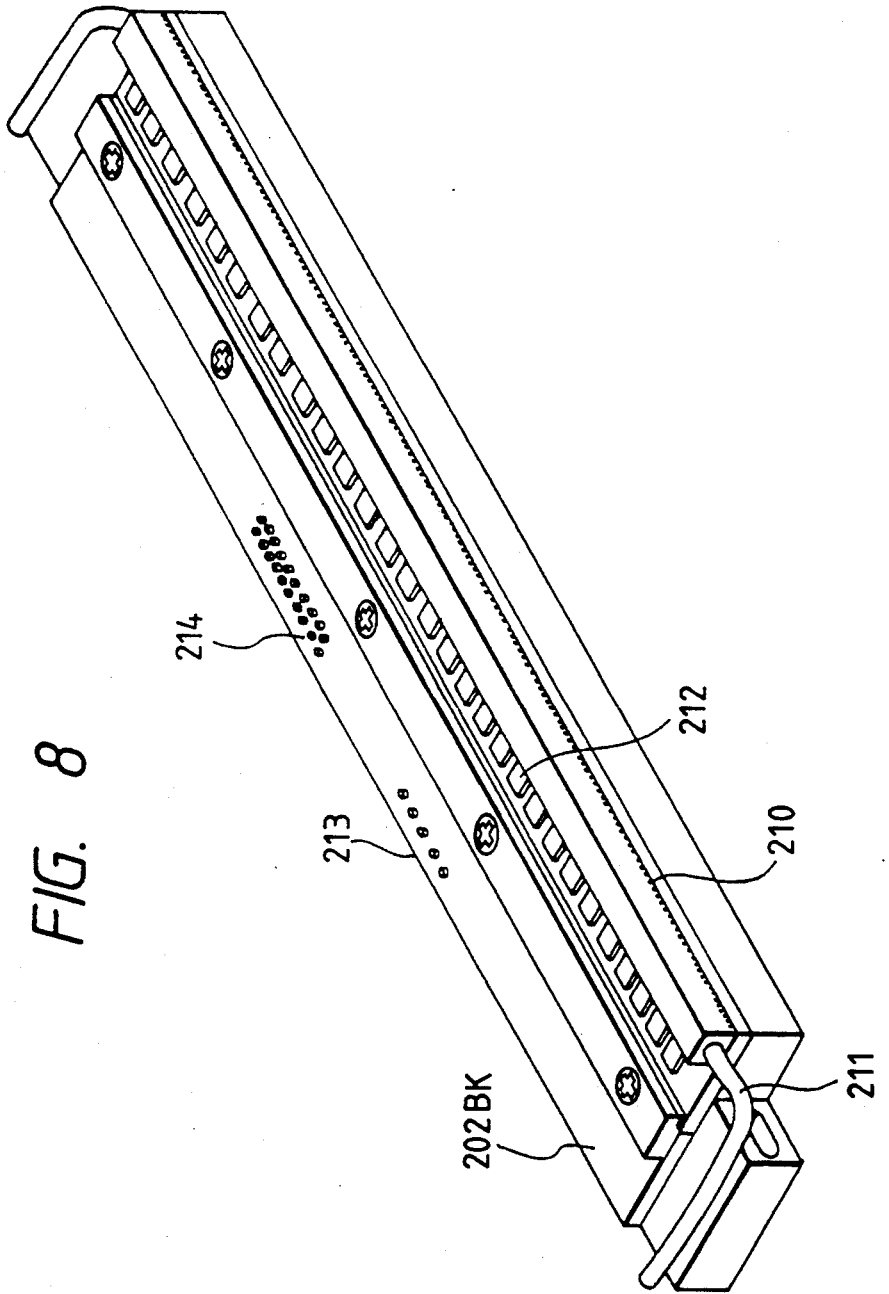
FIG. 8 is a perspective view of the recording head employed in the apparatus shown in FIG. 7.

Also the present invention is applicable not only to the serial printer as explained above but also to a facsimile apparatus equipped with an ink jet recording apparatus having a full-line recording head of which length corresponds to the width of the maximum recording medium, as shown in FIGS. 7 and 8.

Referring to FIG. 7, there are provided paired rollers 201A, 201B for supporting and transporting a recording medium in the sub scanning direction Y indicated by an arrow; and full-multi recording heads 202BK, 202Y, 202M and 202C for respectively recording black, yellow, magenta and cyan colors, each having nozzles arranged over the entire width of the recording medium and arranged in the above-mentioned order from the upstream side in the transporting direction of the recording medium.

A recovery system 200 is brought to a position opposed to the recording heads 202BK-202C and caps said recording heads at the recovery operation for ink discharge. However, in the present embodiment, the number of such discharge recovery operations can be significantly reduced by effecting preliminary heating at a suitable timing.

FIG. 8 is an external view of one of the recording heads 202BK-202C shown in FIG. 7. In FIG. 8 there are shown ink discharge openings 210; an ink supply pipe 211; plural IC's (driving circuits) for driving electrothermal converting elements; and terminals 213, 214.

The control sequence shown in FIG. 5 or 6 is applicable also in case the present invention is applied to a facsimile apparatus equipped with such full-line printer. In such case, the value N in the step S21 in FIG. 6B-1 indicates the number of lines in the sub scanning direction to be scanned at a time by the recording heads, and said value N may be equal to 1.

In order to prevent the ink evaporation from the discharge openings, the capping operation may be combined with so-called idle ink discharge, in which the ink in the vocinity of the discharge openings is discharged in the course of capping operation, independently from the recording information.

Also an idle ink discharge, conducted in a state without capping, more specifically conducted at the timing of uncapping shown in FIGS. 5A and 6A, is also effective for preventing the failure in ink discharge.

However, the idle ink discharge is preferably conducted in the course of capping operation or while the cap is opposed to the recording heads, in consideration of the ease of disposal of the discharged ink.

The present invention is also applicable to a facsimile apparatus equipped with so-called piezo-electric ink jet printer, utilizing a piezoelectric element as the energy source for ink discharge.

Among various ink jet recording processes, the present invention provides particularly advantageous effects in a recording apparatus employing a recording head using the so-called bubble jet process, since such process is suitable for achieving higher density and definition in the recording.

The working principle and structure of said process are preferably based on those disclosed for example in the U.S Pat. Nos. 4,723,129 and 4,740,796. Said process is applicable to so-called on-demand recording or continuous recording, but is particularly advantageous in the on-demand recording because a drive signal, corresponding to the recording information and inducing a rapid temperature increase exceeding the nucleate boiling paint, can be given to an electrothermal converter provided corresponding to a liquid path or a sheet holding liquid therein, thereby generating thermal energy in said electrothermal converter and inducing film boiling on a thermal action plane of the recording head, thus eventually forming a bubble in the liquid, corresponding one-to-one to said drive signal. The liquid (ink) is discharged from a discharge opening by the expansion or contraction of said bubble, thereby forming at least a droplet. Said drive signal is preferably formed as a pulse, in order to realize highly responsive expansion and contraction of said bubble, thus achieving liquid discharge with excellent response. Such pulse-shaped drive signal is preferably that disclosed in the U.S. Pat. Nos. 4,463,359 and 4,345,262. Also still improved recording can be achieved by employing conditions disclosed in the U.S. Pat. No. 4,313,124 concerning the temperature elevation rate of said thermal action plane.

The structure of the recording head employable in the present invention not only includes combinations of the discharge openings, liquid paths (linear or rectangularly bent) and electrothermal converters disclosed in the above-mentioned patents but also the structures disclosed in the U.S. Pat. Nos. 4,558,333 and 4,459,600 in which the thermal action unit is positioned in a bent portion. The present invention is furthermore effective in the structure disclosed in the Japanese Laid-open Patent Sho 59-123670 in which a common slit is utilized as discharge openings for plural electrothermal converters, of the structure disclosed in the Japanese Laid-open Patent Sho 59-138461 in which an opening for absorbing the pressure wave of thermal energy is provided corresponding to the discharge opening. Thus, regardless of the structure of the recording head, the present invention enables secure and efficient recording.

Also as explained in the foregoing embodiments, there may be employed only one recording head corresponding to single-colored ink, or plural recording heads corresponding to plural recording colors. Also there may be employed plural recording heads corresponding to inks of different densities.

As detailedly explained in the foregoing, since the printing operation is conducted in collective manner after a discharge recovery operation when a page in the memory or a page of the original document is fixed, it is rendered possible to reduce the number of idle ink discharges thereby minimizing the wasted ink consumption, and to securely record the received data without omission.

We claim:

1. An image communicating apparatus comprising:
   communication means for effecting communication of a procedure signal relating to the communication of image data;
   memory means for storing the image data;
   communication control means for controlling said memory means so as to store therein image data transmitted from a transmitting unit;
   recording means for discharging ink toward a recording material in accordance with the image data stored in said memory means;
   capping means for capping said recording means, said capping means being capable of a capping operation wherein said capping means caps said recording means and a releasing operation wherein said capping means releases said recording means;
   first control means for controlling said capping means to release said recording means in response to storage in said memory means of a predetermined amount of image data and in response to an end of reception of a page of image data; and
   second control means for controlling said recording means so as to record the image data stored in said memory means after release of said recording means by said capping means.

2. An apparatus according to claim 1, wherein said first control means is adapted to control said capping means to cap said recording means after recording image data stored in said memory means.

3. An apparatus according to claim 1 or 2, wherein said communication control means is adapted to inspect the image data for errors in a predetermined amount of the image data and request re-transmission of the image data when an error is detected.

4. An apparatus according to claim 3, wherein said communication control means is adapted to inspect the errors by half-doubled or full-doubled communication.

5. An apparatus according to claim 3, further comprising plural memory means for storing image data, wherein during printing of the image data stored in one of said plural memory means, received data are stored in another of said plural memory means.

6. An apparatus according to claim 5, wherein, if a predetermined amount of image data is not stored in said another memory means at a completion of printing of the image data stored in said one memory means, said first control means is adapted to control said capping means so as to cap said recording means.

7. An apparatus according to claim 1, wherein in a transmission of image data of a predetermined amount, said first control means is adapted to identify either a protocol signal transmitted at the end of transmission of a page of image data or a protocol signal transmitted at an end of transmission of all pages of image data and to control said capping means to release said recording means.

8. An apparatus according to claim 1, wherein said recording means comprises plural discharge openings for discharging ink and thermal energy generating means respectively provided for said discharge openings and adapted to induce a thermal state change in the ink thereby discharging the ink from the discharge opening and forming a flying liquid droplet.

9. An apparatus according to claim 8, wherein state change involves formation of a bubble by film boiling.

10. An image communicating apparatus comprising:
communication means for effecting communication of a procedure signal relating to the communication of image data;
memory means for storing the image data received by said communication means;
communication control means for controlling said memory means so as to store therein image data transmitted from a transmitting unit, said communication control means being adapted to request retransmission of the image data when an error is detected therein by said communication control means;
recording means for discharging ink toward a recording material in accordance with the image data stored in said memory means;
recovery means operable to maintain a discharge condition of said recording means;
recovery control means for controlling said recovery means in response to storage in said memory means of a predetermined amount of image data and in response to an end of reception of a page of image data; and
recording control means for controlling said recording means so as to record the image data stored in said memory means after operation of said recovery means.

11. An apparatus according to claim 10, wherein said recovery means comprises capping means for capping said recording means, said capping means being capable of a capping operation wherein said capping means caps said recording means and a releasing operation wherein said capping means releases said recording means, and said recovery control means is adapted to release said recording means in response to storage in said memory means of a predetermined amount of image data and in response to the end of reception of a page of image data.

12. An apparatus according to claim 11, wherein said recovery control means is adapted to control said capping means to cap said recording means after recording image data stored in said memory means.

13. An apparatus according to any one of claims 10 to 12, wherein at the transmission of image data of a predetermined amount, said recovery control means is adapted to identify a protocol signal received by said communication means at the end of transmission of a page of image data or at an end of transmission of all pages of image data.

14. An apparatus according to claim 10, wherein said communication control means is adapted to inspect the errors in transmission by half-doubled or full-doubled communication.

15. An apparatus according to any one of claims 10 to 12, wherein said recording means comprises plural discharge openings for discharging ink and thermal energy generating means respectively provided for said discharge opening and adapted to induce a thermal state change in the ink thereby discharging the ink from the discharge openings and forming a flying liquid droplet.

16. An apparatus according to claim 15, wherein said state change involves formation of a bubble by film boiling.

* * * * *

UNITED STATES PATENT AND TRADEMARK OFFICE
CERTIFICATE OF CORRECTION

PATENT NO. : 5,175,566

DATED : December 29, 1992

INVENTOR(S) : SEISHI EJIRI, ET AL.

Page 1 of 2

It is certified that error appears in the above-identified patent and that said Letters Patent is hereby corrected as shown below:

COLUMN 1

Line 31, "a" should read --the--.

COLUMN 2

Line 64, "a" should read --an--.

COLUMN 3

Line 7, "E" should read --D--.
Line 39, "polysylfone," should read --polysulfone,--.

COLUMN 5

Line 48, "recording 20" should read --recording head 20--.

COLUMN 6

Line 12, "is" should be deleted.

COLUMN 7

Line 56, "respective" should read --respectively--.

COLUMN 8

Line 60, "vocinity" should read --vicinity--.

COLUMN 9

Line 21, "paint," should read --point,--.

UNITED STATES PATENT AND TRADEMARK OFFICE
CERTIFICATE OF CORRECTION

PATENT NO. : 5,175,566
DATED : December 29, 1992
INVENTOR(S) : SEISHI EJIRI, ET AL.

It is certified that error appears in the above-identified patent and that said Letters Patent is hereby corrected as shown below:

<u>COLUMN 10</u>

Line 57, "an" should read --the--.
Line 67, "state" should read --said state--.

<u>COLUMN 12</u>

Line 26, "opening" should read --openings--.

Signed and Sealed this

Seventh Day of December, 1993

BRUCE LEHMAN

Attest:

Attesting Officer

Commissioner of Patents and Trademarks